Oct. 13, 1925.
L. M. WOOLSON
HYDROCARBON MOTOR
Filed Nov. 5, 1919
1,556,662
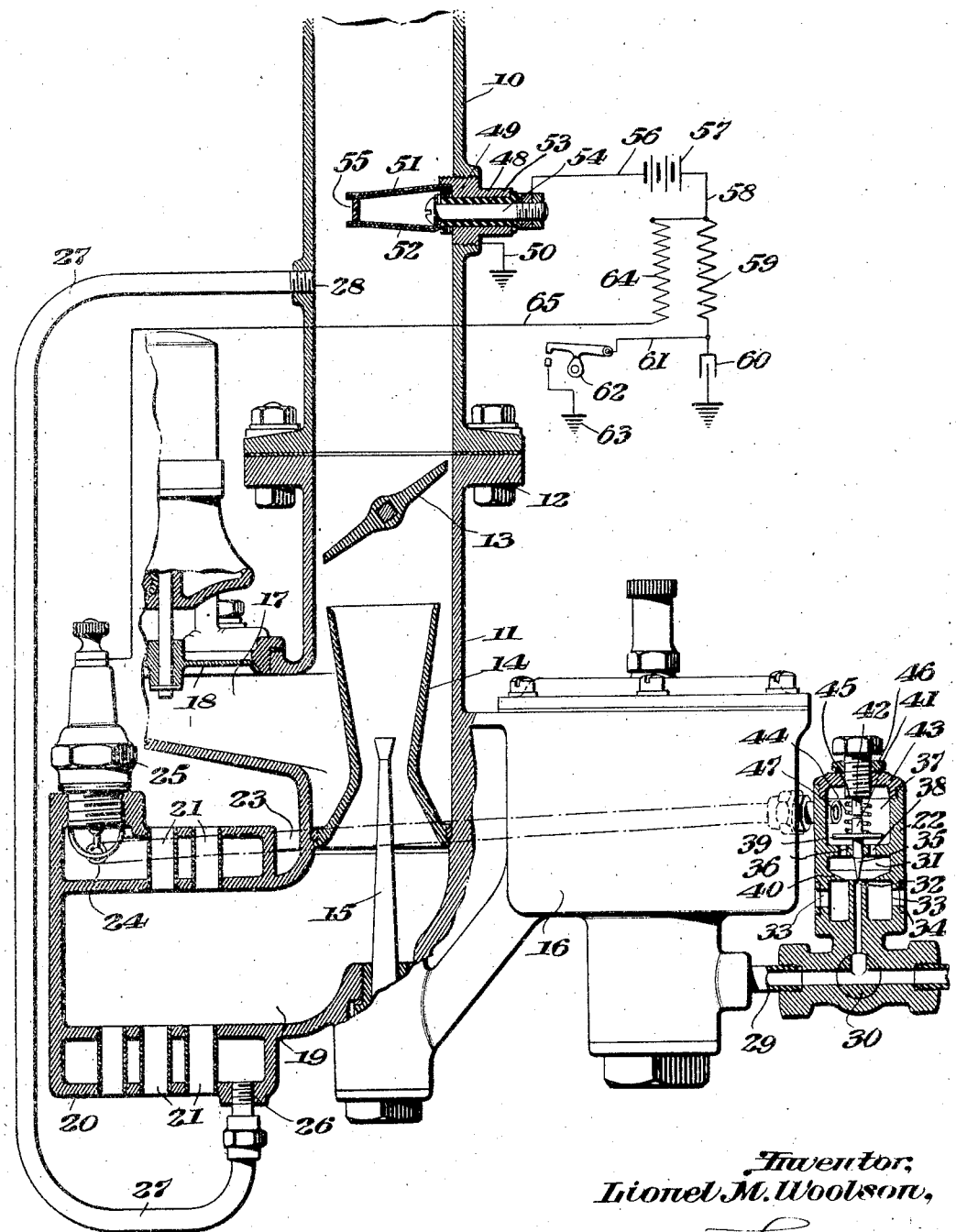
Inventor,
Lionel M. Woolson,
By Patented Oct. 13, 1925.

1,556,662

UNITED STATES PATENT OFFICE.

LIONEL M. WOOLSON, OF DETROIT, MICHIGAN, ASSIGNOR TO PACKARD MOTOR CAR COMPANY, OF DETROIT, MICHIGAN, A CORPORATION OF MICHIGAN.

HYDROCARBON MOTOR.

Application filed November 5, 1919. Serial No. 335,805.

*To all whom it may concern:*

Be it known that I, LIONEL M. WOOLSON, a citizen of the United States, and resident of Detroit, Wayne County, State of Michigan, have invented certain new and useful Improvements in Hydrocarbon Motors, of which the following is a specification.

This invention relates to hydrocarbon motors and particularly to means for heating the mixture thereof.

One of the objects of the present invention is to provide a heater device for the air intake of a carburetor.

Another object of the invention is to provide a combustion heater in connection with the carburetor air intake to thereby provide a heated mixture for the motor.

Another object of the invention is to provide a mixture valve of simple construction in the gasoline feed line of the motor.

Another object of the invention is to automatically control the operation of a combustion heater.

Another object of the invention is to provide thermostatically controlled means for cutting out the action of the combustion heater when the gases in the intake pipe reach a predetermined temperature.

Other objects of the invention will appear from the following description taken in connection with the drawing which forms a part of this specification and in which the figure is a vertical section and part elevation of motor parts embodying my invention.

Referring to the drawings, 10 indicates a motor intake pipe or conduit to which is connected a carburetor 11 as by bolts and flanges 12. The upper or outlet part of the carburetor forms a continuation of the conduit 10 and a butterfly throttle valve 13 is arranged in the conduit for control of the quantity of mixture passing to the motor.

The carburetor in question has a mixing tube 14 surrounding a fuel nozzle 15, which nozzle is supplied with gasoline or other fuel from a float chamber 16 in the usual way. The carburetor has two air intakes or passages, an auxiliary air intake 17, which is controlled by a spring closed valve 18, supplying air to the carburetor around the outside of the mixing tube 14, and a main intake 19 supplying air to the interior of the tube 14 and around the nozzle 15.

For the purpose of providing a heated mixture to the intake pipe 10, the main air intake 19 is provided with a heating jacket 20 through which are numerous openings 21 by which the air enters the intake 19. The heating jacket 20 is supplied with a suitable combustible mixture from a mixture valve 22, which will be hereinafter more fully described, through a pipe 23, the mixture entering the jacket at 24, adjacent a spark plug 25 which ignites the mixture. After the mixture has burned in the jacket 20 it passes out through an outlet 26 and a pipe 27 to the intake pipe 10, which it enters at 28, above the throttle valve 13. Thus the suction of the motor above the throttle valve 13 produces the depression in the jacket 20 which draws mixture from the valve 22 for supplying the heating jacket. As the heating jacket is kept very warm by the constant burning of the mixture therein, the air which passes through the tubes 21 and the intake 19 is thoroughly warmed up and forms a heated mixture with the gasoline from the nozzle 15 and the additional air from the auxiliary air intake 17. This mixture is also further heated by reason of the burnt gases passing into it at the point 28.

The mixture valve 22 above referred to is arranged in the gasoline line 29 that supplies the float chamber 16. A three-way plug valve 30 controls the passage of fuel in this line and permits gasoline to flow both to the float chamber 16 and the valve 22 as it is shown in the drawing, or the valve may be turned 180° to cut off the valve 22 and still supply the float chamber 16, or again the valve may be turned 90° to cut off both the float chamber and the valve 22, or to cut off the float chamber and permit the valve 22 to be supplied.

The valve 22 consists of a casting forming a mixing chamber 31 having a gasoline inlet port 32 and air ports 33. The air ports are adjustably controlled by a surrounding ring 34 which may be turned to open the ports 33 more or less.

The gasoline port 32 may be controlled by a needle valve 35 which extends upwardly through a partition 36 which separates the chamber 31 from a second chamber 37 which is also formed in the casting. Mixture ports 38 are formed in the partition 36 and the valve 35 is provided with a flange 39 which may cover the ports 38 when the valve is in its closed position. An inwardly extending flange 40 is arranged in the chamber 31 adjacent the fuel port 32 to cause the upwardly moving air in the chamber to pass close to said port 32 and thereby mix with the gasoline issuing from said port.

The valve 35 has a stem 41 which is adapted to abut against a stop 42 which is adjustably mounted in the cap 43 at the top of the casting. A spring 44 assists in yieldingly holding the valve 35 in its closed position, this spring having one end against the flange 39 and the other end against a shoulder 45 on the stop 42. A nut 46 locks the stop 42 in adjusted position.

The outlet from the chamber 37 to the tube 23 above referred to is shown at 47.

As suction is created in the tube 23, the depression in the chamber 37 causes the valve 35 to be drawn from its seat and thus open slightly the port 32. Thus gasoline is drawn through said port and air is drawn through the ports 38 which mixes with the gasoline and forms a combustible mixture which passes to the heater jacket 20 through the pipe 23. When the suction ceases, as by the stopping of the motor, the spring 44 closes the valve 35 and prevents escape of gasoline at the port 32.

In case it is desired to use the heater merely for warming up the motor and not during its continued operation, a thermostatic device for controlling the heater may be employed. In the form shown a thermostat 48 may be arranged in the intake pipe 10, preferably above the throttle 13 and above the point 28 where the burnt gas enters the intake pipe. This thermostat consists of a plug 49 threaded into the intake pipe and grounded thereon or as shown at 50. One arm 51 of the thermostat is connected to this plug 49, this arm being formed of two pieces of metal differing in co-efficiency of expansion so that the arm is bent away from the arm 52 which is similarly formed and extends adjacent to it. The arm 52, however, is insulated from the arm 51 as by an insulating block 53 and a bolt 54 passes through the block 53 to the outside of the plug. In the drawing the arms 51 and 52 are shown in contact as at 55 and the circuit, therefore, is closed through them. As the gases passing through the intake pipe become heated the arms 51 are separated and contact at 55 is broken.

The outer end of the bolt 54 is connected through a conductor 56 with a battery 57 which in turn through a conductor 58 is connected to the primary winding 59 of a coil, which winding is grounded through a condenser 60 and is connected by a conductor 61 with a make-and-break device 62, the latter being grounded at 63. The secondary winding 64 of the coil above referred to leads through a conductor 65 to the spark plug 25 hereinabove described, one terminal of the spark plug being grounded on the carburetor to complete the circuit. The make-and-break device 62 is operated by the motor or other device to create a spark in the heater jacket 20 to fire the charge therein and this operation will continue as long as contact is maintained at 55.

It is believed that the operation of the device is clear from the above full description.

Other forms of devices than that shown may be made without departing from the spirit or scope of the invention.

Having thus described my invention, what I claim and desire to secure by Letters Patent is:

1. In a hydrocarbon motor, the combination with the motor intake pipe and a carburetor connected to the intake pipe and having a fuel nozzle and an air intake, of a combustion heater connected to discharge into said intake pipe above the carburetor nozzle and having heat applying means to heat the air as it enters said air intake, said heat applying means being located at a point in advance of the fuel nozzle.

2. In a hydrocarbon motor, the combination with the motor intake pipe, of a combustion heater device having an ignition circuit, and a thermostat arranged in said intake pipe and connected to control said circuit.

3. In a hydrocarbon motor, the combination with the motor intake pipe and the carburetor connected thereto, of a combustion heater adapted to heat the mixture of said carburetor, an ignition circuit for said heater, and a thermostat arranged in the intake pipe in the path of the mixture and connected to control said ignition circuit.

4. In a hydrocarbon motor, the combination with a combustion heater, of a mixture valve therefor comprising a connection in the gasoline supply line, said connection having gasoline and air openings and a mixture passage, a valve adapted to be operated by suction and controlling said passage and one of said openings.

5. In a hydrocarbon motor, the combination with a combustion heater, of a mixture valve therefor comprising a connection in the gasoline supply line, said connection having gasoline and air openings and a mixture passage, a valve adapted to be operated by suction and controlling said passage and said gasoline opening.

6. In a hydrocarbon motor, the combination with the motor intake pipe having a throttle valve therein and a carburetor connected to the intake pipe and having a mixing chamber, a fuel nozzle therein, and an air intake, of a combustion heater connected to heat the air as it enters said air intake and heat the mixture as it passes through said motor intake pipe above the throttle valve, said heat applying means being located at a point removed from adjacent proximity to the fuel nozzle.

In testimony whereof I affix my signature.

LIONEL M. WOOLSON.